(12) United States Patent
Carpentier et al.

(10) Patent No.: US 9,334,363 B2
(45) Date of Patent: *May 10, 2016

(54) MONOMERS ISSUED FROM RENEWABLE RESOURCES AND PROCESS FOR POLYMERISING THEM

(71) Applicants: TOTAL RESEARCH & TECHNOLOGY FELUY, Seneffe (BE); CENTRE NATIONAL DE LA RECHERCHE SCIENTIFIQUE (CNRS), Paris (FR)

(72) Inventors: Jean-Francois Carpentier, Acigne (FR); Sophie Guillaume, Vitre (FR); Marion Helou, Rennes (FR); Yann Sarazin, Rennes (FR); Olivier Miserque, Mont-Saint-Guibert (BE)

(73) Assignees: Total Research & Technology Feluy, Seneffe (BE); Centre National de la Recherche Scientifique (CNRS, Paris (FR)

( * ) Notice: Subject to any disclaimer, the term of this patent is extended or adjusted under 35 U.S.C. 154(b) by 163 days.

This patent is subject to a terminal disclaimer.

(21) Appl. No.: 13/871,277

(22) Filed: Apr. 26, 2013

(65) Prior Publication Data
US 2013/0237683 A1    Sep. 12, 2013

Related U.S. Application Data

(63) Continuation of application No. 12/919,537, filed as application No. PCT/EP2009/051870 on Feb. 17, 2009, now Pat. No. 8,461,290.

(30) Foreign Application Priority Data

Feb. 26, 2008    (EP) .................................. 08290187

(51) Int. Cl.
*C08G 64/30*    (2006.01)
*C08G 64/02*    (2006.01)
*C08K 5/00*    (2006.01)

(52) U.S. Cl.
CPC ............ *C08G 64/305* (2013.01); *C08K 5/0091* (2013.01)

(58) Field of Classification Search
CPC ...................................... C08G 64/305–64/307
See application file for complete search history.

(56) References Cited

U.S. PATENT DOCUMENTS 6,316,590 B1 * 11/2001 Coates ................. B01J 31/1608
502/155

OTHER PUBLICATIONS

Pego et al (Physical properties of high molecular weight 1,3-trimethylene carbonate and D,L-lactide copolymers, Journal of Materials Science: Materials in Medicine 14 (2003) 767-773).*
Kricheldorf et al (Macromol Chem Phys, 2000, 201, No. 17, pp. 2557-2565).*

* cited by examiner

*Primary Examiner* — Rachel Kahn
(74) *Attorney, Agent, or Firm* — Albert Shung

(57) ABSTRACT

This invention relates to the synthesis of polycarbonates prepared from carbonate monomers derived from the biomass in the presence of a system comprising an organometallic transfer agent and alcohol. It also relates to the polymers resulting from these cyclic compounds.

11 Claims, 2 Drawing Sheets a   b   c   e   d

MONOMERS ISSUED FROM RENEWABLE RESOURCES AND PROCESS FOR POLYMERISING THEM

CROSS-REFERENCE TO RELATED APPLICATIONS

This application is a Continuation of U.S. application Ser. No. 12/919,537, filed on Jan. 4, 2011, which claims the benefit of PCT/EP2009/051870, filed on Feb. 17, 2009, which claims priority from EP 08290187.7, filed on Feb. 26, 2008.

This invention relates to the synthesis of polycarbonates prepared from cyclic monomers derived from the biomass in the presence of a system comprising an organometallic catalyst and a transfer agent. It also relates to the resulting polymers of cyclic monomer.

Several methods have been developed to prepare polycarbonates. The starting material is selected either from a five- or from a six-membered carbonate monomer. There is an abundant literature describing the synthesis of these compounds. The synthesis of six-membered carbonates is described for example in Bhanage et al. (Bhanage B. M. Fujita S., Ikushima Y., Arai M., in Green Chemistry, 5, 429, 2003), or in Wang et al. (Wang X. L., Zhuo, R. X., Liu L. J., He F., Liu G., in J. Polym. Sci, Part A, 40, 70, 2002), or in Wolinsky et al. (Wolinsky J. B., Ray III W. C., Colson Y. L. Grinstaff M. W., in Macromolecules, 40, 7065, 2007, or in Gasset et al (EP-A-0, 955,298).

The synthesis of five-membered carbonates is described for example in Aresta and Dibenedetto (Aresta M., Dibenedetto A., J. Mol. Catal. A: Chem., 257, 149, 2006) or in Robicki et al. (Robicki G., Rakoczy P., Parzuchowski P., in Green Chem., 7, 529, 2005) or in Ubaghs et al. (Ubaghs L., Fricke N., Keul H., Höcker H., in Macromol. Rapid Comm., 25, 517, 2004), or in Komura et al. (Komura H., Yoshino T., Ishido Y., in Bulletin of the chemical society of Japan, 46, 550, 1973) or in Matsumoto et al. (Matsumoto K., Fuwa S., Shimojo M., Kitajima H., in Bull. Chem. Soc. Jpn, 69, 2977, 1996).

Polymerisation of carbonates was typically carried out by ring-opening of the five- or six-membered carbonates either by organometallic catalysis or by organic catalysis. The advantage of organometallic catalysis was that it offers a controlled polymerisation. The most frequently used catalytic components were based on Sn(Oct)$_2$ as described for example in Kricheldorf and Stricker (Kricheldorf H. R., Stricker A., in Macromol. Chem. Phys. 201, 2557, 2000)

or biocompatible metals such as Mg, Ca, Fe or Zn as described for example in Darensbourg et al. (Darensbourg D., Wońsook C., Poulomi G., Casseday R., in Macromol. 37, 4374, 2006) or in Dobrzinsky et al. (Dobrzinsky P., Pastusiak M., Bero M., in J. Polym. Sci. Part A Polym. Chem., 43, 1913, 2004) or in Kuran et al. (Kuran W., Sobczak M., Listos T., Debek C., Florjanczyk Z., in Polymer. 41, 8531, 2000)

or group 3 metal (including the lanthanide series) complexes such as described for example in Palard et al. (Palard I., Schappacher M., Belloncle B., Soum A., Guillaume S., in Chem. Eur. J. 13, 1511, 2007) or in Zhao et al. (Zhao B., Lu C., Shen Q., in J. Appl. Polym. Sci., 25, 517, 2004) or in Sheng et al. (Sheng H., Zhou L., Zhang Y., Yao Y., Shen Q., in J. Polym. Sci. Part A Polym. Chem., 45, 1210, 2007).

The advantage of organic catalysis was that it offered polymerisation under mild conditions with non-metal catalyst components. They were based on enzymes such as described for example in Bisht et al. (Bisht S. K., Svirkin Y. Y., Henderson L. A., Gross R. A., in Macromolecules, 30, 7735, 1997) or in Gross et al. (Gross R. A., Kumar A., Kalra B., in Chem. Rev., 101, 2109, 2001) or in Koboyashi et al. (Koboyashi S., Uyama H., Kimura S., in Chem. Rev., 101, 3793, 2001).

organic compounds such as amines or guanidine as described for example in Nederberg et al. (Nederberg F., Lohmeijer G. B., Leibfarth F., Pratt R. C., Choi J., Dove A. P., Weymouth R. M., Heidrich J. L., in Biomacromolecules, 8, 153, 2007) or in Mindemark et al. (Mindemark J. Hilborn J., Bowden T., in Macromolecules, 40, 3515, 2007).

It is an aim of the present invention to provide a method for polymerising cyclic carbonate compounds using small amounts of a metal catalyst.

It is another aim of the present invention to use, in combination with the small amounts of the metal catalyst, large amounts of a transfer agent to achieve so-called "immortal" polymerisation of cyclic carbonate compounds.

It is a further aim of the present invention to control and tune the characteristics and properties of the resulting polycarbonates.

In particular, it is another aim to prepare functionalised polycarbonates selectively end-capped by a group originating from the transfer agent.

It is yet another aim of the present invention to apply the method of the immortal ring-opening polymerisation to new cyclic carbonates derived from glycerol.

Any one of those aims is, at least partially, fulfilled by the present invention.

LIST OF FIGURES

Accordingly, the present invention discloses a process for polymerising five- or six-membered cyclic carbonates by ring-opening polymerisation in the presence of a system comprising an organometallic compound and an alcohol, characterised in that the number average molecular weight Mn of the final polymer is controlled by the ratio monomer/alcohol.

The method is very efficient to polymerise cyclic carbonates in a highly controlled manner using minute amounts of organometallic compound with a large excess of alcohol, under mild reaction conditions.

The alcohol is acting as co-activator and transfer agent. It is in a first role the initiator of the ring-opening and in a second role, a fast reversible exchange takes place between the growing polymer chains and the free alcohol moieties. Excess alcohol molecules, being involved in said rapid and reversible exchange with the growing chains thus appear to act as transfer agents.

The organometallic compound can be selected from metallic complexes of formula MR$_n$, wherein M is a metal Group 2, 3 (including the lanthanide series, hereafter referred as Ln), 8, 12 or 13 of the periodic Table, wherein each R is selected independently from hydrogen, an hydrocarbyl radical having from 1 to 12 carbon atoms, an alkoxide group OR* wherein R* is a linear or branched hydrocarbyl having from 1 to 12 carbon atoms, an amido group NR$_2$ wherein R is of general formula YR#$_3$ wherein Y is Si or C and each R# is independently selected from hydrogen or hydrocarbyl having from 1 to 12 carbon atoms, a borohydride group or an halide, and wherein n is the valence of M.

Preferably, M is Mg(II), Ca(II), Y(III), Fe(II), Fe(III), Zn(II), or Al(III).

Preferably each R is selected independently from an amido group such as N(SiMe$_3$)$_2$, N(SiHMe$_2$)$_2$, an alkoxide group OR' such as OiPr, OMe, OBn, . . . , or a borohydride group (BH$_4$) . . . .

The alcohol can be represented by formula R'OH wherein R' is an hydrocarbyl, linear or branched, having from 1 to 20 carbon atoms. Preferably R' is a secondary alkyl residue or benzylic group, more preferably it is isopropyl ($^i$Pr) or benzyl (Bn) or a combination thereof.

The polymerisation reaction can be represented by:

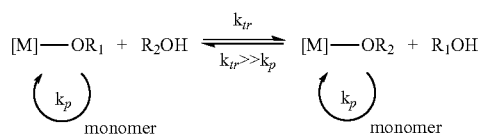

R$_1$, R$_2$=growing polymer chain; [m]: organometallic fragment k$_{tr}$: transfer rate constant; k$_p$: propagation rate constant In the present polymerisation scheme, alcohol acts as a reversible transfer agent. During chain propagation, a rapid alkoxide/alcohol exchange takes place. It is observed, for the first time for cyclic carbonate monomers, that, as the ratio alcohol/metal increases, the molecular weight of the polymer chains decreases to the same extent.

If the rate of transfer reaction k$_{tr}$ is rapid enough relative to the polymerisation rate k$_p$, the molar mass distribution of the macromolecules formed is narrow.

Figure 1:
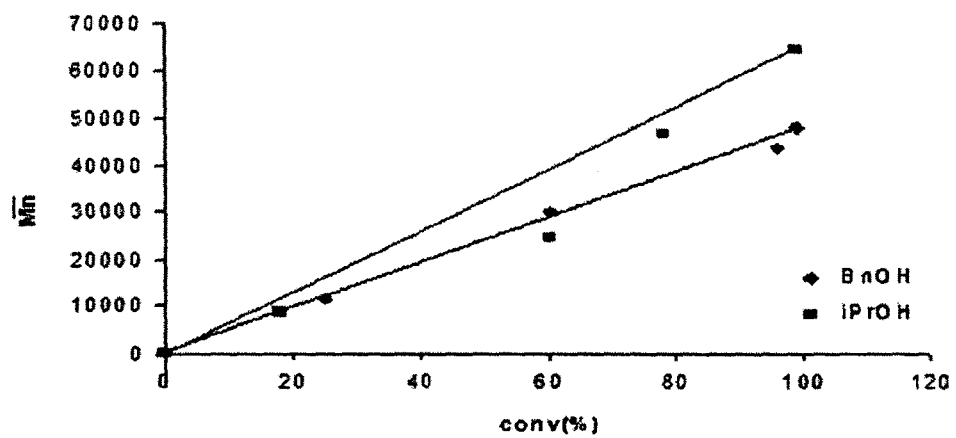
FIG. 1 represents the number average molecular weight Mn of poly(trimethylcarbonate) expressed in Da as a function of conversion rate expressed in % for two different alcohols, BnOH and $^i$PrOH respectively.

At a constant alcohol/metal ratio, the molecular weight of the polycarbonate depends upon the nature of the alcohol as can be seen in FIG. 1 representing the number average molecular weight Mn of poly(trimethylcarbonate) as a function of conversion percentage for two different alcohols, BnOH and $^i$PrOH, respectively. It is also observed that the relationship is linear.

Figure 2:
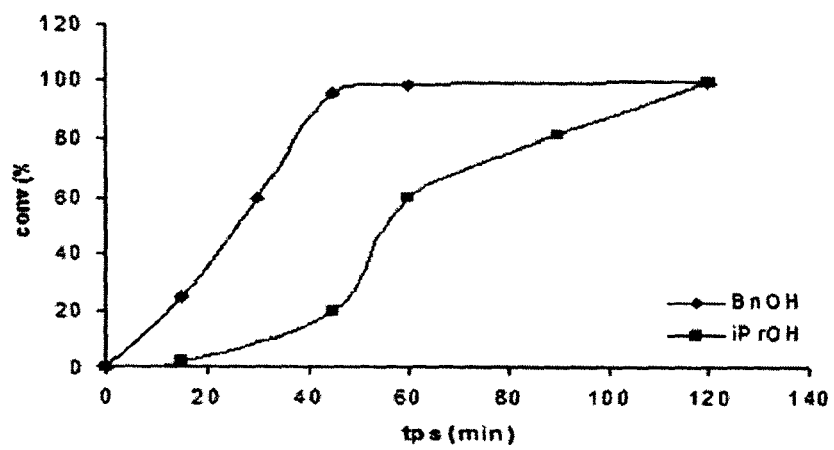
FIG. 2 represents the conversion of trimethylcarbonate expressed in % as a function of time expressed in minutes for two different alcohols, BnOH and $^i$PrOH respectively.

It is also observed that the nature of the alcohol has an influence on the activity of the system generated from ZnEt$_2$. More generally, we speculate that this might reflect the degree of aggregation (m) of the alkoxide-metal species {M(OR)$_n$}$_m$ generated from the combination of the MR$_n$ precursor and R'OH agent. This can be seen for example in FIG. 2 which represents the conversion percentage of trimethylenecarbonate as a function of time for two different alcohols, BnOH and $^i$PrOH, respectively. It can be seen that there is no induction period when BnOH is used as transfer agent whereas the catalytic system based on $^i$PrOH shows an important induction period of over 20 minutes.

In another embodiment according to the present invention the catalyst system used to start the ring-opening polymerisation of cyclic carbonates is a single-site catalyst component based upon a bulky β-diiminate ligands (BDI) as described by Coates et al. (B. M. Chamberlain, M. Cheng, D. R. Moore, T. M. Ovitt, E. B. Lobkovsky, and G. W. Coates, in J. Am. Chem. Soc., 2001, 123, 3229). It is represented by general formula

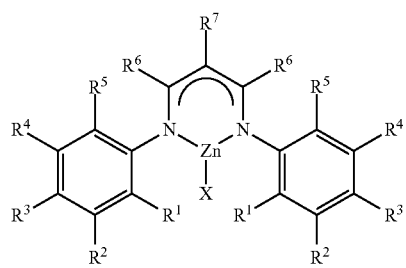

Wherein R$^1$, R$^2$, R$^3$, R$^4$, R$^5$, R$^6$ and R$^7$ are each independently selected from hydrogen, unsubstituted or substituted hydrocarbyl, or inert functional group and wherein two or more of said groups can be linked together to form one or more rings, wherein X is an hydrocarbyl radical having from 1 to 12 carbon atoms, an alkoxide group OR*, an amido group NR**$_2$ or a borohydride group (BH$_4$).

It is acting by a coordination/insertion mechanism.

Among the preferred catalytic compounds according to the present invention, one can cite [BDI]Zn(N(SiMe$_3$)$_2$), {[BDI]Zn(OiPr),}$_2$, Zn(N(SiMe$_3$)$_2$), ZnEt$_2$, Y(N(SiMe$_3$)$_2$), "Y(OiPr)$_3$", and Al(OiPr)$_3$.

In these embodiments, the catalyst system also comprises an alcohol, as described above. This alcohol acts as an activator, eventually transforming in situ the catalyst precursor into an active metal-alkoxide species. Excess alcohol acts as transfer agent, transferring propagating polycarbonate chains from the active metal center to dormant hydroxy-capped polycarbonate chains. Accordingly, it is observed that the number average molecular weight increases when the ratio monomer/alcohol increases. The amount of alcohol is selected to obtain a ratio monomer/alcohol ranging between 25 and 25000, preferably between 200 and 2500.

This system allows transforming very large amounts of monomer with minute amounts of metal catalyst. The ratio monomer/metal is of from 1000 up to 100000.

Optionally, the alcohol can contain a functional group which will be selectively capping the terminus of each polycarbonate chain. This functional group can be used for various purposes. As non-limiting examples, one can cite:

a) vinyl end-groups which can promote further copolymerisation with other monomers;

b) nitroxide or alkoxyamine end-groups which can promote controlled radical polymerisation and/or ring-opening polymerisations, c) fluorinated pony-tails.

Polymerisation can be carried out in bulk or in solution. Usual aromatic and aliphatic hydrocarbons can be used for that purpose.

Polymerisation is conducted at a temperature ranging from 20° C. to 180° C. preferably between 50 and 150° C. The pressure ranges from 0.5 to 20 atm, preferably it is 1 atm.

The polycarbonates thus prepared show typically a unimodal molecular weight distribution that ranges from 1.1 to 5.0, more typically from 1.5 to 2.5.

The number average molecular weight Mn can be tuned by the monomer-to-alcohol ratio and ranges from 1 000 to 1 000 000 g/mol, more typically from 10 000 to 250 000 g/mol.

This polymerisation process is operative for 5- to 7-membered cyclic carbonates. Preferably, this polymerisation process is operative for 6-membered cyclic carbonates.

As non-limitative examples, one can cite: trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH).

In particular, one can site new cyclic carbonates such as 2-oxy-trimethylenecarbonate (OTMC), and dehydrotrimethylenecarbonate (DHTMC).

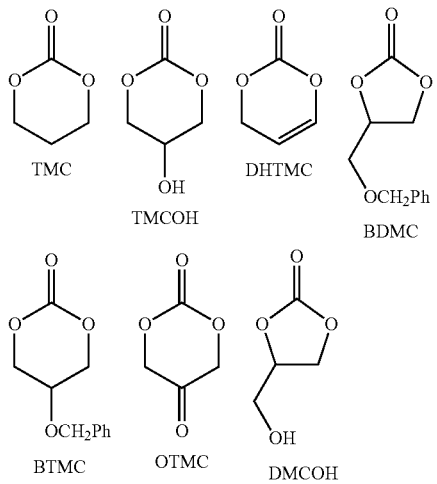

Copolymers resulting from any combinations of these monomers are also included in the present invention.

EXAMPLES

The polymerisation of trimethylenecarbonate (TMC) has been carried out with various catalyst components, alcohol initiators and polymerisation conditions.

Example 1

TMC was polymerised in the presence of diethylzinc (ZnEt$_2$) and an alcohol initiator

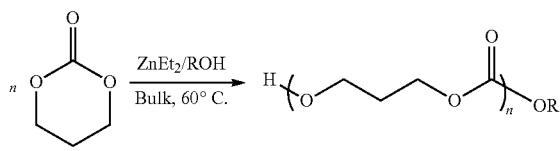

ROH.

Alcohol ROH was selected from $^i$PrOH or BnOH, the polymerisation temperature was of 60° C.

The polymerisation time and the ratio TMC/ZnEt$_2$/ROH were varied as indicated in Table I.

The conversion rate expressed in %, the theoretical and experimental number average molecular weight and the polydispersity index D are disclosed in Table I.

The polydispersity index PI is determined by the ratio Mw/Mn of the weight average molecular weight Mw over the number average molecular weight Mn.

The theoretical number average molecular weight was calculated as $$Mn_{theo} = [TMC]/[BnOH] \times M_{TMC} \times \text{conversion} + M_{BnOH}$$

with $M_{TMC}$=102.9 g/mol, $M_{BnOH}$=108.14 and $M_{iPr}$=60.10 g/mol

TABLE I

| Alcohol | TMC/ZnEt$_2$/ROH | Time min | Conv. % | Mn$_{theo}$ g/mol | Mn$_{exp}$ g/mol | PI |
|---|---|---|---|---|---|---|
| iPrOH | 1000/1/2 | 120 | 99 | 51100 | 64400 | 1.65 |
| iPrOH | 1000/1/5 | 150 | 100 | 20500 | 28500 | 1.75 |
| iPrOH | 1000/1/10 | 150 | 100 | 10300 | 21000 | 1.56 |
| iPrOH | 1000/1/20 | 130 | 100 | 5160 | 7600 | 1.3 |
| BnOH | 1000/1/2 | 60 | 99 | 50600 | 65200 | 1.68 |
| BnOH | 1000/1/5 | 60 | 100 | 20500 | 21100 | 1.74 |
| BnOH | 1000/1/10 | 60 | 100 | 10300 | 15000 | 1.48 |
| BnOH | 1000/1/20 | 60 | 100 | 5100 | 6500 | 1.28 |
| BnOH | 1000/1/50 | 150 | 90 | 1950 | 2600 | 1.15 |

The molecular weights Mn and Mw, and polydispersity index were determined by Size Exclusion Chromatography (SEC) in THF versus PS standards and corrected with a Mark-Houwink factor of 0.73.

There is an excellent correlation between the theoretical and the experimental (corrected) values of molecular weight Mn. It can be seen also that the molecular weight decreases when the ratio TMC/alcohol decreases, that is when the amount of alcohol increases.

Figure 3:
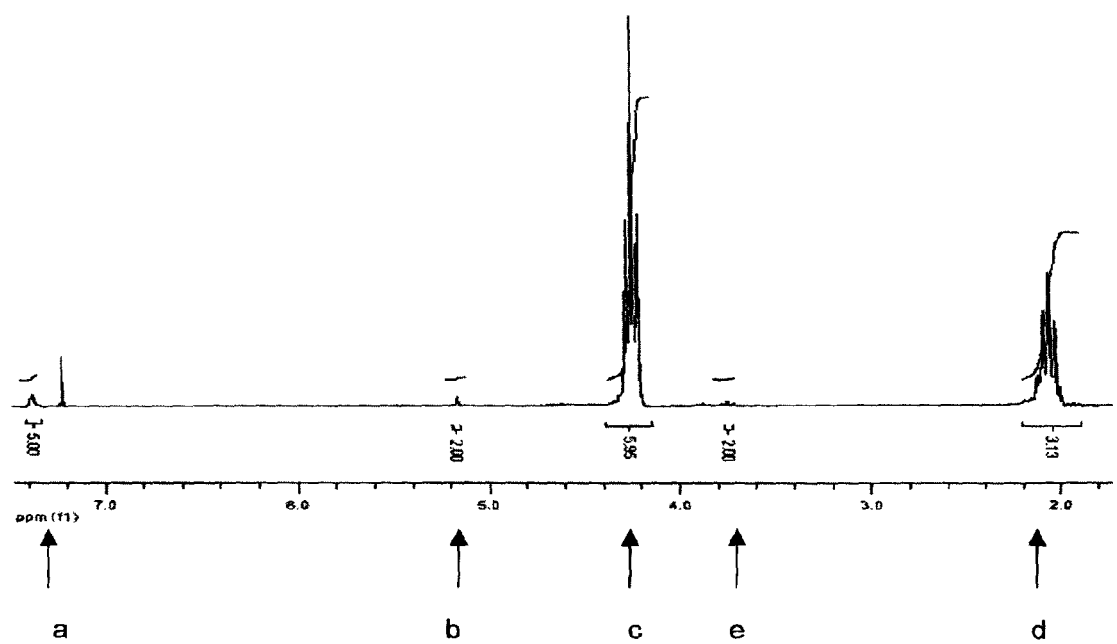
FIG. 3 represents the $^1$H NMR spectrum of the precipitated polymer prepared in example 1.
Figure 3:
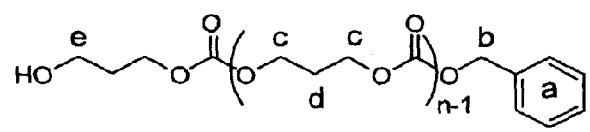

The $^1$H NMR spectrum of the precipitated polymer can be seen in FIG. 3

Example 2

The polymerisation of trimethylene carbonate was carried out with β-diiminate-Zn—[N(SiMe$_3$)$_2$] and an alcohol.

In a first step, β-diiminate-Zn[N(SiMe$_3$)$_2$] was prepared according to a method developed by Coates et al. (B. M. Chamberlain, M. Cheng, D. R. Moore, T. M. Ovitt, E. B. Lobkovsky, and G. W. Coates, in J. Am. Chem. Soc., 2001, 123, 3229).

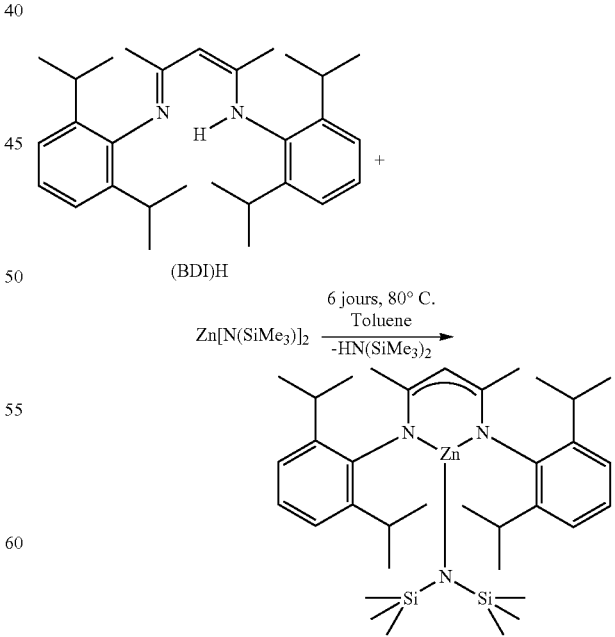

The polymerisation was then carried out according to the following scheme:

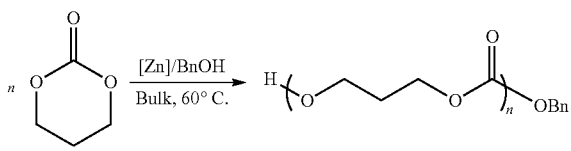

The alcohol used in all polymerisation experiments was BnOH and the temperature was of 60° C. to 110° C. The zinc complex and the alcohol were reacted under stirring prior to introduction of the monomer for a period of time of from 15 minutes to 180 minutes. In the absence of preliminary reaction, the observed molecular weight $M_n$ was much larger than the calculated Mn. The experimental conditions and results are displayed in Table II.

TABLE II

| TMC/ Zn/ROH | Temp (° C.) | Time min | Conv. % | $Mn_{theo}$ g/mol | $Mn_{RMN}$ g/mol | $Mn_{exp}$ g/mol | PI |
|---|---|---|---|---|---|---|---|
| 500/1/1 | 60 | 8 | 95 | 48600 | 46300 | 42000 | 1.7 |
| 500/1/2 | 60 | 8 | 100 | 25600 | 30250 | 27700 | 1.65 |
| 500/1/5 | 60 | 7 | 99 | 10200 | 10400 | 12400 | 1.55 |
| 500/1/10 | 60 | 30 | 100 | 5200 | 5750 | 7300 | 1.38 |
| 500/1/20 | 60 | 60 | 99 | 2600 | 2800 | 3500 | 1.35 |
| 1000/1/5 | 60 | 10 | 100 | 2040 | 25600 | 25900 | 1.6 |
| 1000/1/50 | 60 | 20 | 89 | 1920 | 1990 | 2200 | 1.17 |
| 2000/1/5 | 60 | 15 | 79 | 32200 | nd | 35700 | 1.9 |
| 2000/1/20 | 60 | 30 | 95 | 9800 | 11000 | 13100 | 1.38 |
| 5 000/1/20 | 60 | 75 | 90 | 23 060 | nd | 28 760 | 1.70 |
| 10 000/1/20 | 60 | 180 | 89 | 45 500 | nd | 45 900 | 1.67 |
| 25000/1/5 | 110 | 40 | 80 | 408470 | nd | 190000 | 1.70 |
| 25000/1/10 | 110 | 40 | 83 | 211940 | nd | 185200 | 1.63 |
| 25 000/1/20 | 60 | 900 | 75 | 95 820 | nd | 93 440 | 1.65 |
| 25 000/1/20 | 110 | 30 | 73 | 93 190 | nd | 102 200 | 1.69 |
| 25 000/1/20 | 110 | 50 | 96 | 122 500 | nd | 110 230 | 1.84 |
| 25000/1/50 | 110 | 40 | 80 | 40945 | nd | 50300 | 1.88 |
| 50 000/1/20 | 110 | 120 | 93 | 237 150 | nd | 160 600 | 1.68 | it can be seen that, in this example also, the number average molecular weight Mn increases with increasing ratio monomer/alcohol.

Minute amounts of zinc, as low as 20 ppm versus the monomer, can be used to convert up to 50,000 equiv. of TMC within short reaction time periods.

Example 3

The polymerisation of trimethylenecarbonate was carried out with aluminium tris(isopropoxide) $Al(O^iPr)_3$ at a temperature of 60 or 110° C. with and without alcohol, as indicated in table III.

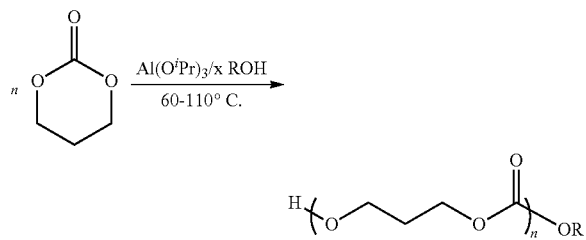

The experimental conditions and results are displayed in Table III.

TABLE III

| Alcohol | TMC/ Al/ROH | T ° C. | Time min | Conv. % | $Mn_{theo}$ g/mol | $Mn_{RMN}$ g/mol | PI |
|---|---|---|---|---|---|---|---|
| — | 1500/1/0 | 60 | 60 | 5 | 2500 | nd | nd |
| — | 1500/1/0 | 60 | 120 | 26 | 13300 | nd | nd |
| — | 500/1/0 | 110 | 5 | 70 | 17000 | 124000 | 1.66 |
| — | 500/1/0 | 110 | 10 | 100 | 17000 | 118000 | 1.63 |
| — | 500/1/0 | 110 | 10 | 100 | 17000 | 119000 | 1.66 |
| — | 500/1/0 | 110 | 20 | 100 | 17000 | 95100 | 1.89 |
| iPrOH | 500/1/5 | 110 | 10 | 100 | 10260 | 15700 | 1.4 |
| BnOH | 500/1/5 | 110 | 10 | 100 | 10300 | 11300 | 1.47 |
| BnOH | 2000/1/20 | 110 | 30 | 99 | 10200 | 12800 | 1.38 |

In the absence of alcohol, there is no correlation between the observed and calculated molecular weight Mn and the activity is very low. It can be concluded that the catalyst component is modified by the addition of alcohol.

Comparing the different catalyst systems used in the polymerisation of carbonates, the following conclusions can be derived.

In the reaction

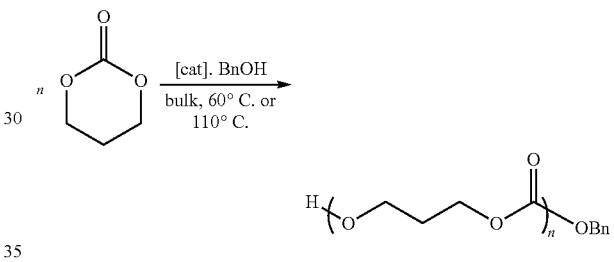

wherein [cat] was either $Al(iPrO)_3$ or $(BDI)Zn[N(SiMe_3)_2]$ and thus wherein a different metal was used wherein TMC/(Zn or Al)/BnOH=2000/1/20 similar results were observed in terms of conversion rate (95%), molecular weight $M_n$ (12000), and polydispersity index (1.38), but the polymerisation temperature was much higher for Al than for Zn. Zinc is thus more active than aluminium.

In the reaction

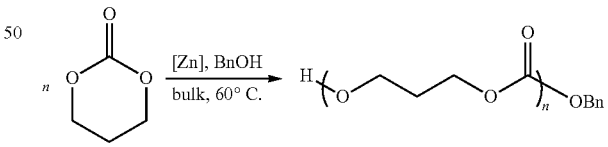

wherein the same metal was used, but in different metallic compounds, $ZnEt_2$ and $(BDI)Zn[N(SiMe_3)_2]$ respectively, wherein the ratio TMC/Zn/BnOH=1000/1/50 similar results were obtained in terms of conversion rate (90%), molecular weight $M_n$ (2000) and polydispersity index (1.15)

but polymerisation with $(BDI)Zn[N(SiMe_3)_2]$ occurred much faster than with $ZnEt_2$, 20 minutes vs 150 minutes respectively.

In the reaction

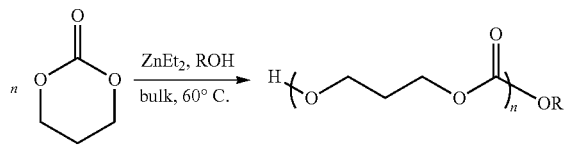

wherein the metallic compound is $ZnEt_2$,
wherein the polymerisation temperature is of 60° C., and
wherein the ration TCM/Zn/ROH=1000/1/2, but
wherein different alcohols are used, BnOH vs $^i$PrOH similar results are observed in terms of conversion rate (99%), molecular weight $M_n$ (64400) and polydispersity index (1.65), but the polymerisation time is shorter for BnOH than for $^i$PrOH, 60 minutes vs 120 minutes respectively.

It was further observed that the conversion rate increased with increasing temperature.

The invention claimed is:

1. A process for polymerising five- or six- or seven-membered cyclic carbonates by ring-opening polymerisation in the presence of a system comprising an organometallic compound and alcohol;
    wherein a ratio of monomer/metal ranges between 10,000 and 100,000 and wherein a number average molecular weight Mn of the final polymer increases with increasing monomer/alcohol ratio;
    wherein the organometallic compound is selected from [BDI]Zn(N(SiMe3)2) and {[BDI]Zn(OiPr),}2.

2. The process of claim 1, to prepare homo- or co-polymers of carbonate and wherein the carbonate comprises a 5- or 6-membered cyclic carbonate selected from trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trim ethylenecarbonate (OTMC), dehydrotrimethylenecarbonate (DHTMC), or a combination thereof.

3. The process of claim 1, wherein the alcohol is isopropyl (iPr) or benzyl (Bn).

4. The process of claim 1, wherein the alcohol additionally contains a functional group that caps the end of each polycarbonate chain.

5. The process of claim 1, wherein the monomer/alcohol ratio is of from 25 to 25000.

6. The process of claim 1, wherein the monomer/alcohol ratio is of from 200 to 2500.

7. The process of claim 1, wherein an alcohol to metal ratio ranges from 1 to 50.

8. A process for polymerising five- or six- or seven-membered cyclic carbonates by ring-opening polymerisation in the presence of a system comprising an organometallic compound and alcohol;
    wherein a ratio of monomer/metal ranges between 10,000 and 100,000 and wherein a number average molecular weight Mn of the final polymer increases with increasing monomer/alcohol ratio;
    wherein the organometallic compound is a single-site catalyst component based upon a bulky β-diiminate ligand (BDI) represented by general formula

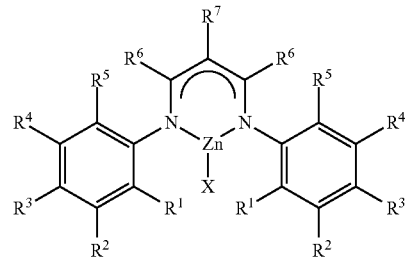

wherein $R^1$, $R^2$, $R^3$, $R^4$, $R^5$, $R^6$ and $R^7$ are each independently selected from hydrogen, unsubstituted or substituted hydrocarbyl, or inert functional group, wherein two or more of said groups can be linked together to form one or more rings, wherein X is an hydrocarbyl radical having from 1 to 12 carbon atoms, an alkoxide group OR*, an amido group NR**$_2$ or a borohydride group ($BH_4$), wherein R* is a linear or branched hydrocarbyl having from 1 to 12 carbon atoms, and wherein each R** is independently of general formula $YR^\#_3$ wherein Y is Si or C and each $R^\#$ is independently selected from hydrogen or hydrocarbyl having from 1 to 12 carbon atoms, a borohydride group or an halide.

9. The process of claim 8, to prepare homo- or co-polymers of carbonate and wherein the carbonate comprises a 5- or 6-membered cyclic carbonate selected from trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC), or a combination thereof.

10. The process of claim 9, wherein the five- or six-membered cyclic carbonate comprises OTMC, DHTMC, or combinations thereof.

11. A process for polymerising five- or six- or seven-membered cyclic carbonates by ring-opening polymerisation in the presence of a system comprising an organometallic compound and alcohol;
    wherein a ratio of monomer/metal ranges between 10,000 and 100,000 and wherein a number average molecular weight Mn of the final polymer increases with increasing monomer/alcohol ratio;
    wherein the alcohol acts as both a co-activator to initiate ring-opening polymerization and as a transfer agent;
    wherein the organometallic compound:
        is a single-site catalyst component based upon a bulky β-diiminate ligand (BDI) represented by general formula

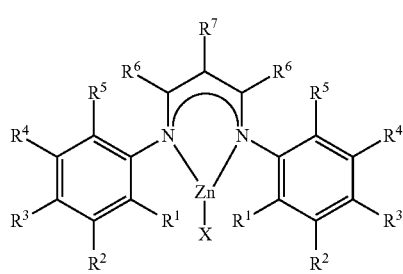

wherein $R^1$, $R^2$, $R^3$, $R^4$, $R^5$, $R^6$ and $R^7$ are each independently selected from hydrogen, unsubstituted or substituted hydrocarbyl, or inert functional group, wherein two or more of said groups can be linked together to form one or more rings, wherein X is an hydrocarbyl radical having from 1 to 12 carbon atoms, an alkoxide group OR*, an amido group NR**$_2$ or a borohydride group (BH$_4$), wherein R* is a linear or branched hydrocarbyl having from 1 to 12 carbon atoms, and wherein each R** is independently of general formula YR$^{\#}_3$ wherein Y is Si or C and each R$^{\#}$ is independently selected from hydrogen or hydrocarbyl having from 1 to 12 carbon atoms, a borohydride group or an halide.

* * * * *